United States Patent
Yang et al.

(10) Patent No.: US 7,864,409 B2
(45) Date of Patent: Jan. 4, 2011

(54) FABRICATION METHOD FOR QUASI-PHASE-MATCHED WAVEGUIDES

(75) Inventors: Woo Seok Yang, Gyeonggi-do (KR); Han Young Lee, Gyeonggi-do (KR); Hyung Man Lee, Gyeonggi-do (KR); Woo Kyung Kim, Gyeonggi-do (KR); Soon Sup Park, Gyeonggi-do (KR)

(73) Assignee: Korea Electronics Technology Institute (KR)

( * ) Notice: Subject to any disclaimer, the term of this patent is extended or adjusted under 35 U.S.C. 154(b) by 769 days.

(21) Appl. No.: 11/861,447

(22) Filed: Sep. 26, 2007

(65) Prior Publication Data

US 2008/0087632 A1    Apr. 17, 2008

(30) Foreign Application Priority Data

Oct. 13, 2006    (KR) ...................... 10-2006-0099615

(51) Int. Cl.
*G02F 1/35* (2006.01)
*G02F 2/02* (2006.01)

(52) U.S. Cl. .................... 359/326; 359/327; 359/328

(58) Field of Classification Search .................. None
See application file for complete search history.

(56) References Cited

U.S. PATENT DOCUMENTS

| | | | | |
|---|---|---|---|---|
| 5,359,452 A | * | 10/1994 | Nitanda et al. | 359/328 |
| 5,380,410 A | * | 1/1995 | Sawaki et al. | 361/225 |
| 2003/0179439 A1 | * | 9/2003 | Lin et al. | 359/326 |
| 2004/0227986 A1 | * | 11/2004 | Kurz et al. | 359/328 |
| 2006/0079006 A1 | * | 4/2006 | Yamamoto et al. | 438/3 |

* cited by examiner

*Primary Examiner*—Duy-Vu N Deo
(74) *Attorney, Agent, or Firm*—Thomas, Kayden, Horstemeyer & Risley, LLP

(57) ABSTRACT

The present invention relates to a fabrication method for a quasi-phase-matched waveguide. The method includes the steps of forming a metal etch mask on a ferroelectric single crystal substrate, etching the substrate by using the etch mask, removing the etch mask, forming conductive layers on the etched substrate, forming polarization regions by applying an electric field to the conductive layers, and flattening the substrate after removing the conductive layers. Accordingly, the present invention is advantageous in that it can be applied to various fields employing a ferroelectric substrate, such as $LiNbO_3$, $LiTaO_3$, $Mg:LiNbO_3$ or $Zn:LiNbO_3$, it can obtain more accurate and uniform periodic domain inversion devices with a high quality and can fabricate devices that are cheaper and have a better performance.

12 Claims, 8 Drawing Sheets

FABRICATION METHOD FOR QUASI-PHASE-MATCHED WAVEGUIDES

BACKGROUND OF THE INVENTION

1. Field of the Invention

The present invention relates to a fabrication method for a waveguide, and more particularly, to a method of fabricating periodic domain inversion regions within a ferroelectric single crystal substrate by employing an etching process.

2. Background of the Related Art

Many researches have been conducted on quasi-phase-matching wavelength conversion devices employing a ferroelectric substrate having a non-linear characteristic for a long time. Important application fields employing this technique can include displays, light sources for the next-generation recording media, optical communication systems and so on. In particular, in case where quasi-phase matching is implemented through periodic inversion of domains within these ferroelectric crystals, high efficiency characteristics can be obtained. In general, the inverted domains are fabricated in a periodic polarization form. The domain fabricated by this method is referred to as a periodic polarization inversion ferroelectric substance.

In a periodic polarization process, important factors which affect devices can include regularity of the polarization-inverted domain cycle and accurate control of the inversion cycle interval. These factors decide the quality or efficiency, and the range of applications of fabricated devices.

For this reason, a variety of methods for forming the periodic polarization inversion domains within the ferroelectric substance have been developed, and the principles thereof are classified depending on a change in the shape of an electrode and the type of external force for domain inversion.

In particular, among these methods, an external electric field application method has been used as a representative one. Further, many researches have been conducted on light-assisted poling (hereinafter, referred to as "LAP") in which light and an electric field are irradiated at the same time, all optical poling (hereinafter, referred to as "AOP") in which only light is used without applying an external electric field, and so on.

FIG. 1a shows a periodic polarization inversion method based on an electric field application method employing z-cut lithium niobate (LiNbO$_3$) crystals. In order to form periodic domains within a Z-axis ferroelectric substrate 100, conductive layers 110 have to be formed on the crystal surface so that an external electric field can be applied to the crystals. The shape of the conductive layers becomes a domain inversion shape, and domain inversion always proceeds from a positive (+) plane to a negative (−) plane. Thus, the conductive layers have to be formed on the positive (+) plane. The conductive layers can be fabricated by two kinds of methods. One method includes directly forming a metal pattern on the crystal surface. The other method includes forming a pattern on the crystal surface by using organic substance such as a photo-sensitizer, and then forming an opened space so that an external electric field can be applied to the crystals through conductive liquid.

Therefore, after patterns for domain inversion are formed on a ferroelectric Z-axis positive (+) plane, an external electric field is applied to the +Z plane, thus forming a periodic inversion structure. For the purpose of domain inversion of Z-axis crystals, a coercive field of 21 KV/mm or higher is required. In this case, a periodic polarization structure can be obtained over the entire regions ranging from the +Z plane to the −Z plane.

FIG. 1b shows a periodic polarization inversion method based on an electric field application method employing x-cut LiNbO$_3$ crystals. Domain inversion always proceeds in the Z-axis. Thus, a straight conductive layer 130 is formed one side on a substrate 120 of an x-axis crystal so that it is vertical to the Z-axis. Further, branch-shaped conductive layers 140, which are spaced apart at a certain distance, have to be formed on the other side on the substrate 120.

Consequently, polarization is inverted by a mutual electric field between the branch-shaped conductive layers and the straight conductive layer, and a distance between the widths of the branch-shaped conductive layers becomes a periodic domain inversion cycle. In case where periodic polarization inversion is performed by employing x-axis ferroelectric crystals, there is an advantage in that coercive voltage is relatively small compared with domain inversion of Z-axis crystals since a distance between electrodes for polarization inversion is short.

In addition, LAP in which both light and an electric field are irradiated is a method of inverting domains by irradiating light of wavelengths of 457 nm, 488 nm, and 514 nm under a uniform external electric field. In this case, a pattern of the light becomes a domain pattern. Furthermore, AOP employing only light is a method of inverting domains by irradiating only light without an external electric field. In this case, a pattern of the light becomes a domain pattern.

However, the above methods have lots of problems, such as a low domain depth, irregularity of domains, and control of domains formed, and therefore cannot be commercialized.

In the conventional external electric field application method for periodic domain inversion, if the Z-axis substrate is employed, the highest voltage is applied to the edges of the electrode pattern formed on the substrate, so that initial domain nucleation for domain inversion is formed. Thus, domain tips are created in a direction vertical to the −z side along the nucleation formed at the electrode edges of the +z plane. Further, an external electric field through the electrode is applied within the electrode as well as the electrode edges. It has an effect on the domains inwardly and outwardly from the electrode. Thus, domain walls, which are collections of the domain tips, proceed in both directions on the basis of the edges of the electrode. The progress of the domain walls is stopped when they are combined within the electrode. Accordingly, the formed periodic domains have the following problems.

First, since the domains are inverted through the whole crystal substrate, they have a high aspect ratio, so that a domain cycle that can be fabricated is limited.

Second, there is a difference between a pattern on a substrate for domain formation and a domain cycle that is substantially formed. Thus, control is difficult as the cycle is short.

Third, a coercive voltage of about 21 KV/mm or higher is required for the purpose of domain inversion.

Fourth, domain quality is limited due to irregularity of an external voltage.

Meanwhile, if a ferroelectric substrate x-axis is employed, there is an advantage in that a coercive voltage is low because of a short distance between electrodes. However, as polarization is inverted by a voltage applied to both electrodes, there are disadvantages in that a domain depth is shallow, and the regularity of a domain cycle is poor when compared with a method of employing Z-axis crystals.

SUMMARY OF THE INVENTION

Accordingly, the present invention has been made in view of the above problems occurring in the prior art, and it is an object of the present invention to improve the regularity of the cycle of domains by etching a ferroelectric single crystal substrate, forming a periodic polarization region for quasi-phase matching, and fabricating a periodic polarization inversion waveguide made of only single crystal by using the periodic polarization region.

Another object of the present invention is to provide a method of easily fabricating a periodic domain inversion region within a ferroelectric single crystal substrate.

A domain polarization inversion method for quasi-phase matching according to an embodiment of the present invention includes the steps of forming a metal etch mask on a ferroelectric single crystal substrate, etching the substrate by using the etch mask, removing the etch mask, forming conductive layers on the etched substrate, forming polarization regions by applying an electric field to the conductive layers, and flattening the substrate after removing the conductive layers.

A domain polarization inversion method for quasi-phase matching according to another embodiment of the present invention includes the steps of forming a metal etch mask on a ferroelectric single crystal substrate, etching the substrate by using the etch mask, removing the etch mask, forming photoresist patterns on the etched substrate, coating a conductive solution on regions other than regions where the patterns are formed, forming polarization regions by applying an electric field to the conductive solution, and flattening the substrate after removing the conductive solution.

The method further includes, after the substrate is flattened, the steps of forming a waveguide by etching the substrate, joining a dummy substrate to the waveguide, and removing regions other than etched regions.

In the present invention, at the time of periodic polarization inversion for quasi-phase matching, etching of the substrate employing an etch mask is performed to a depth of 1 to 10 μm, and etching, in the step of forming the waveguide by etching the periodic polarization inverted substrate, is performed to a depth of 3 to 15 μm.

In the present invention, the etch mask comprises any one of nickel, titanium, chrome and a photosensitizer, and the ferroelectric single crystal substrate comprises at least one of $LiNbO_3$, $LiTaO_3$, $Mg:LiNbO_3$ and $Zn:LiNbO_3$.

In the present invention, the step of joining the waveguide and the dummy substrate is performed by using ultraviolet-curable or heat-curable epoxy or wax.

In the present invention, the dummy substrate has the same material as that of the ferroelectric single crystal substrate, or a material having a refractive index lower than that of the ferroelectric single crystal substrate.

BRIEF DESCRIPTION OF THE DRAWINGS

Further objects and advantages of the invention can be more fully understood from the following detailed description taken in conjunction with the accompanying drawings in which.

DETAILED DESCRIPTION OF THE PREFERRED EMBODIMENT

The present invention will now be described in detail in connection with specific embodiments with reference to the accompanying drawings.

Embodiment

FIGS. 2a to 2f show processes of a z-cut substrate in which patterned electrodes for polarization according to the present invention are formed.

Figure 1A:
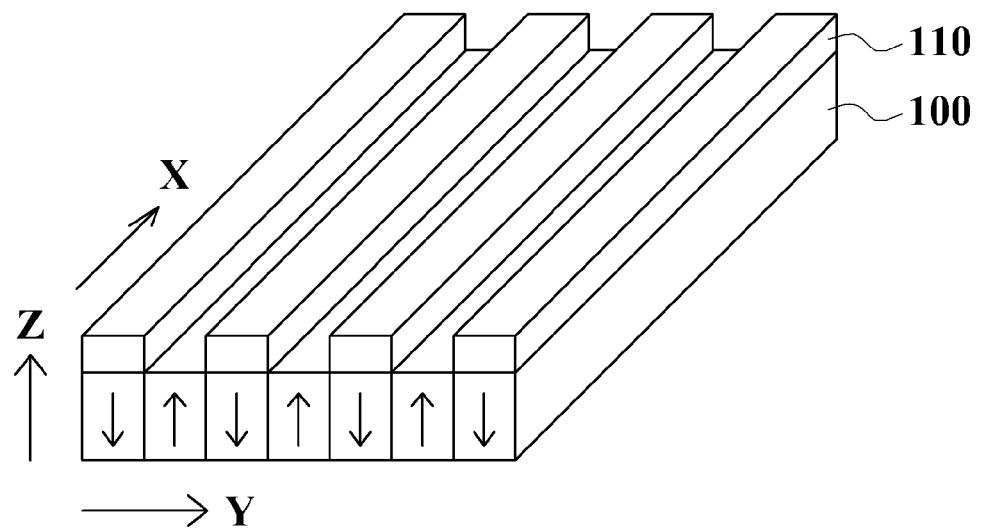
FIG. 1a is a three-dimensional view of a z-cut substrate in which patterned electrodes for conventional polarization are formed.
Figure 1B:
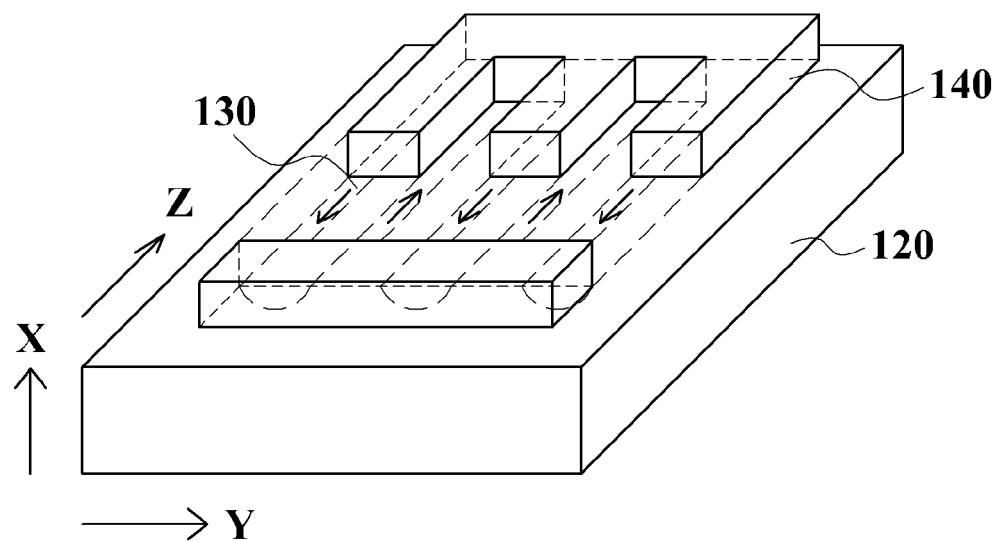
FIG. 1b is a three-dimensional view of an x-cut substrate in which patterned electrodes for conventional polarization are formed.
Figure 2A:
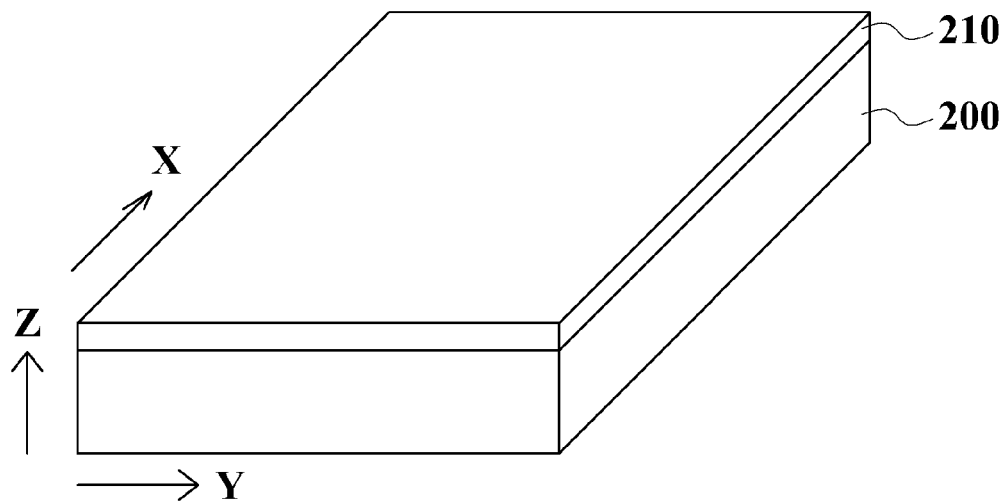
FIGS. 2a to 2f show processes of a z-cut substrate in which patterned electrodes for polarization according to the present invention are formed.

A photoresist film 210 is first formed on a ferroelectric single crystal substrate 200 (FIG. 2a).

The ferroelectric material can include lithium niobate ($LiNbO_3$, LN), lithium tantalate ($LiTaO_3$, LT), lithium niobate to which magnesium is added ($Mg:LiNbO_3$, MgLN), lithium niobate to which zinc is added ($Zn:LiNbO_3$, ZnLN) or the like. In order to form the substrate of this complex material, ZnO or MgO powder is added to $Li_2CO_3$ and $NbO_5$ powder for growing crystals of $LiNbO_3$ and then have them grow.

Figure 2B:
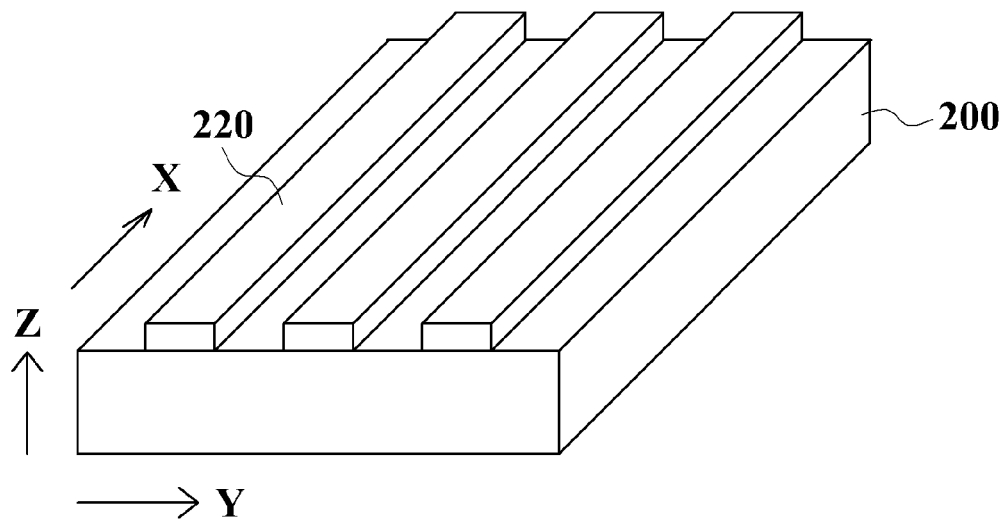

A photolithography process is then performed, as shown in FIG. 2b, forming photoresist patterns 220 (FIG. 2b).

Figure 2C:
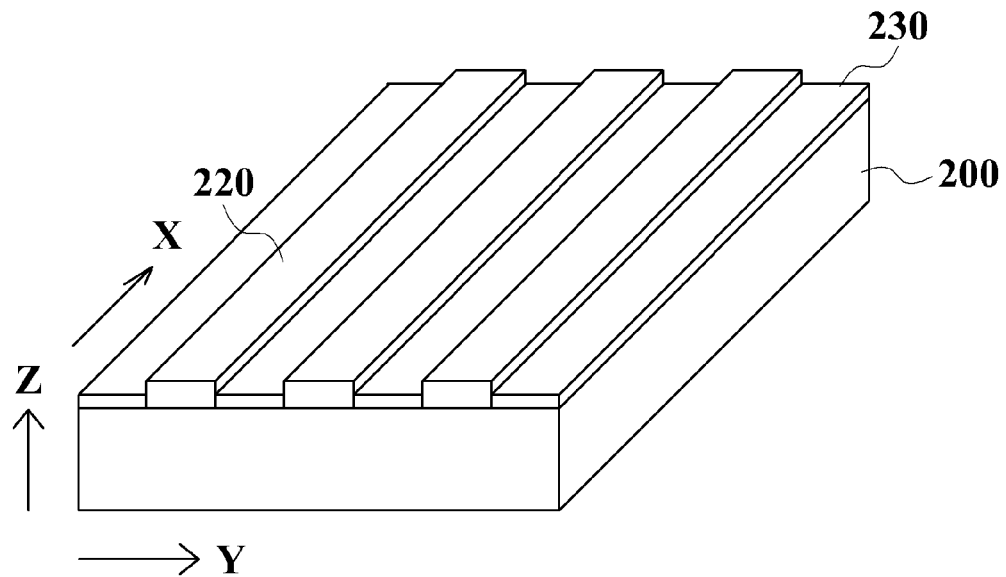

Metal is deposited on the entire surface of the substrate 200 on which the photoresist patterns 220 are formed, or electroplating is performed on the substrate 200 on which the photoresist patterns 220 are formed, forming metal etch masks 230 on regions where the photoresist patterns are not formed (FIG. 2c).

At this time, in case where the metal etch masks 230 are formed by employing electroplating, it is preferable to form a seed layer (not shown) for electroplating before forming the photoresist film 210 on the ferroelectric substrate 200, and to perform subsequently forming the photoresist film 210, patterning, and electroplating.

Figure 2D:
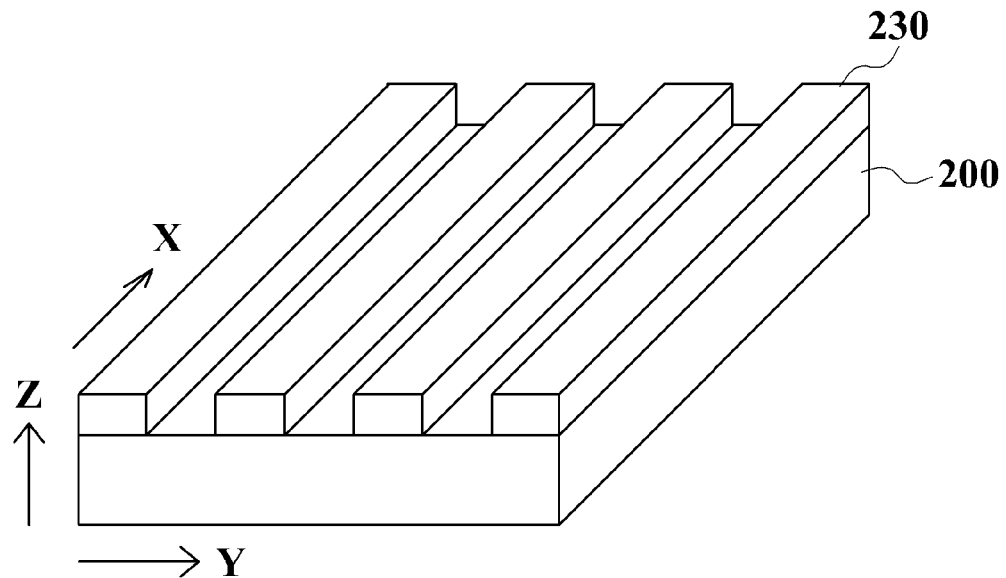

The photoresist patterns 220 existing on the ferroelectric single crystal substrate 200 are all removed as shown in FIG. 2d, thus completing the formation of the metal etch masks 230 on the ferroelectric single crystal substrate 200 (FIG. 2d).

The metal etch masks 230 can be formed by using nickel (Ni), chrome (Cr), titanium (Ti) or the like. In an embodiment of the present invention, the etch masks were formed by using Ni.

Figure 2E:
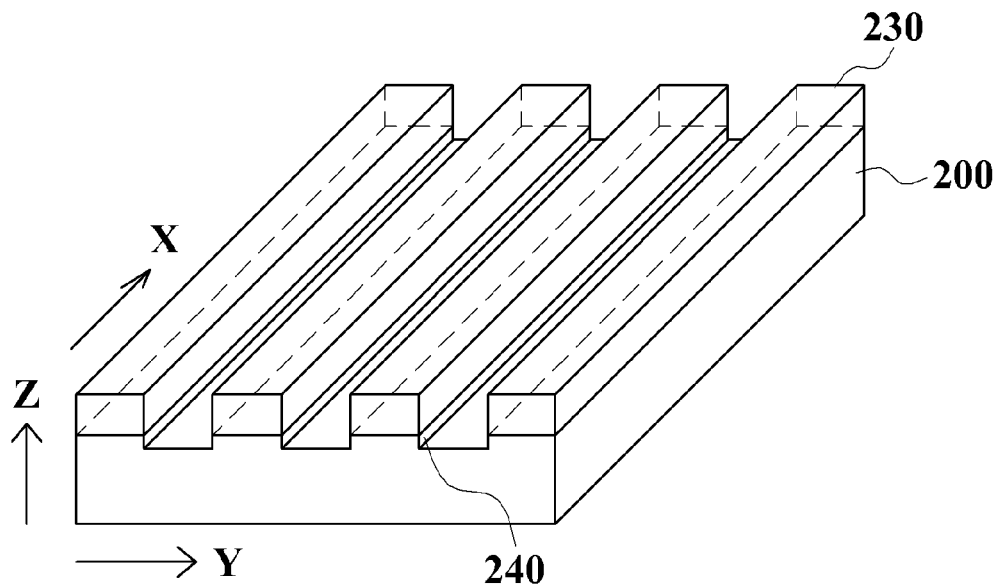

Thereafter, the ferroelectric single crystal substrate 200 on which the metal etch masks 230 are formed is etched by dry etch employing a mixed gas comprising fluorine as a principle element, hydrogen and an inert gas, or wet etch employing a HF solution, so that etched regions 240 having a depth of 1 to 10 μm are formed (FIG. 2e).

Figure 2F:
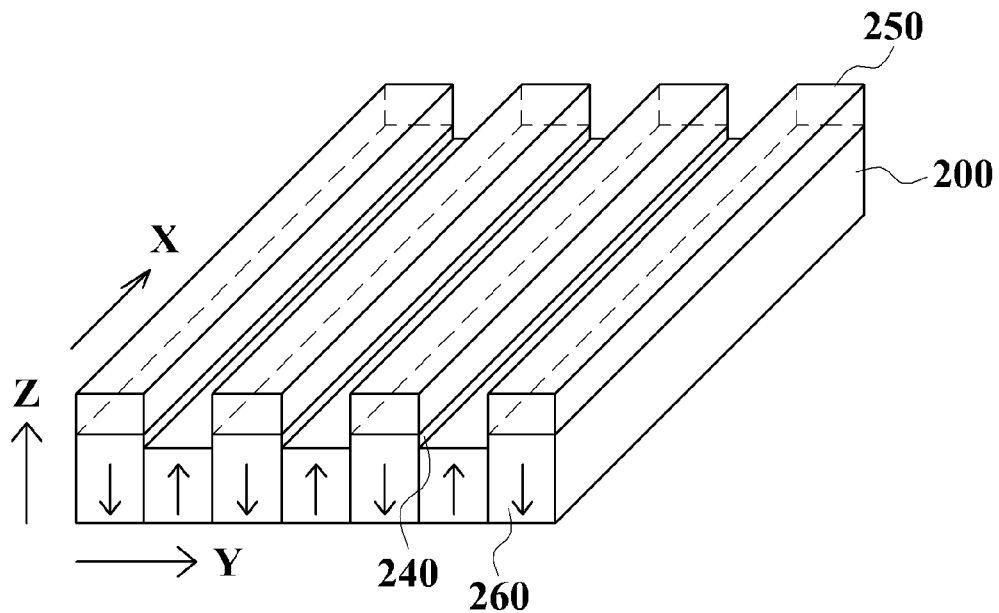

After the etched regions 240 are formed, metal electrodes 250, that is, conductive layers are formed on unetched top surfaces of the substrate. Periodic polarization inversion is then performed by applying an external electric field to the metal electrodes 250 from a +z axis to a −z axis (FIG. 2f).

In this case, additional metal electrodes can be formed after the metal etch masks are removed. Alternatively, the metal etch masks can be used as the metal electrodes without removing them.

Meanwhile, instead of forming the metal electrodes, organic substance such as a photosensitizer can be patterned on the ferroelectric single crystal substrate 200, and polarization inversion can be carried out by applying an external electric field by using a conductive solution such as LiCl.

As described above, according to the present embodiment, in the process of forming the polarization structure, a part of the ferroelectric single crystal substrate is etched so that steps having predetermined intervals are formed on the substrate and, therefore, the metal electrodes are formed. Thus, regions to which an electric field is applied exist on the upper side, but regions on which the metal electrodes are not formed and from which an electric field is shielded exist on the lower side.

It is therefore possible to prevent domain walls from moving at the interface between the regions to which an electric field is applied and the regions ranging from which an electric field is shielded.

Consequently, an etch pattern formed on the ferroelectric single crystal substrate becomes a periodic inverted domain size.

In other words, in the present invention, in the domain inversion process, the domain cycle is decided through an etching process, not through control by an external electric field. Accordingly, more accurate and uniform periodic domain inversion devices with a high quality can be fabricated.

Another Embodiment

Figure 3:
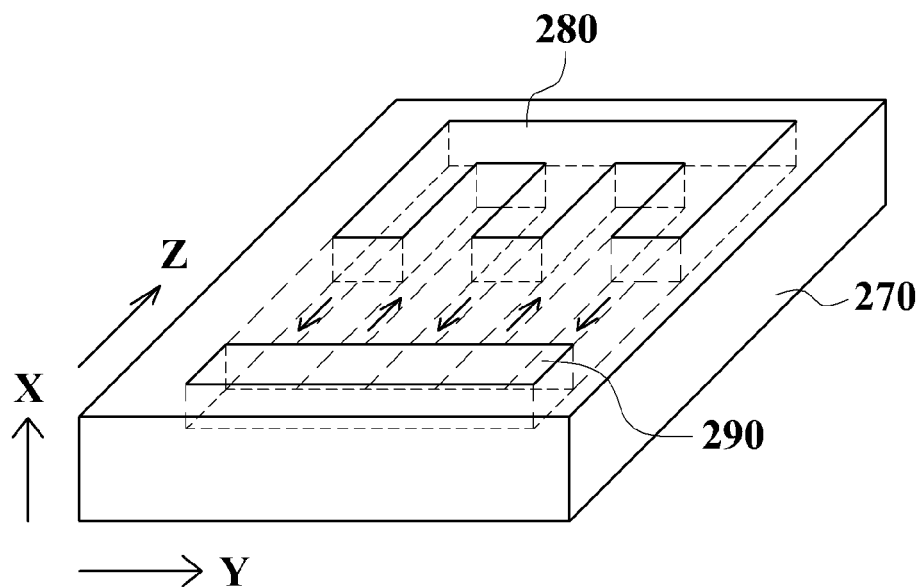
FIG. 3 is a three-dimensional view of an x-cut substrate in which patterned electrodes for polarization according to the present invention are formed.

FIG. 3 is a three-dimensional view of an x-cut substrate in which patterned electrodes for polarization according to the present invention are formed. Metal electrodes 280, 290 are formed within an x-cut ferroelectric single crystal substrate 270, and periodic polarization inversion is then performed by applying an external electric field from a +z axis to a −z axis.

Before such periodic polarization inversion is carried out, metal etch masks are formed on the x-axis substrate and an etching process is performed on the substrate. This can be performed in a similar method to the fabrication process of the z-cut substrate in which the patterned electrodes for polarization are formed.

First, in order to etch the ferroelectric single crystal substrate, dry etch employing a mixed gas comprising fluorine as a principle element, hydrogen and an inert gas, or wet etch employing a HF solution is performed by the same method as the process for Z-axis crystal etching.

Materials of the metal etch masks necessary for the etching process can include Ni, Ti, Cr, a photosensitizer or the like. In the case of wet etch, the photosensitizer is used. If the metal etch masks are formed on the ferroelectric substrate, the etching process is performed to a depth of about 1 to 10 μm.

In the case of periodic domain inversion employing x-axis crystals, the two kinds of metal electrodes 280, 290 are formed within the substrate in order to apply an external electric field, as shown in FIG. 3.

The first kind of a metal electrode is the electrode 280 having a branch shape, and the second kind of a metal electrode is the electrode 290 having a straight shape.

Therefore, the etch patterns formed on the x-axis substrate also have the straight and branch shapes.

By forming metal electrodes in the etched substrate patterns by using a deposition apparatus, or filling the etched substrate patterns with metal through electroplating, an external electric field can be applied horizontally to the Z-axis. Thus, periodic polarization inversion domains with a high quality can be formed.

Still Another Embodiment

One surface of a Z-axis periodic polarization inversion ferroelectric substrate, which is fabricated by the same method as those of the above two embodiments, has an etched surface. Thus, in the case of a bulk device, there is no problem in use, but a problem in that it cannot be used in devices employing an optical waveguide.

Meanwhile, the x-axis periodic polarization inversion ferroelectric substrate fabricated by this method does not have prominence and depression in the inversion regions. The ferroelectric substrate can be used as optical waveguide application devices through a method, such as bulk and metal diffusion, unlike the Z-axis periodic polarization inversion ferroelectric substrate. However, in order to use the ferroelectric substrate as an optical waveguide comprising only a ferroelectric material, a fabrication process based on the same method as that of the Z-axis ferroelectric substrate has to be performed.

This is because, if etched prominence and depression exist on the surface of the optical waveguide substrate since the ferroelectric substrate is formed on the surface, it damages the optical waveguide, which makes it impossible to use the optical waveguide as a device.

Thus, the prominence and depression portions of each substrate have to be removed.

In a detailed embodiment, a prepared substrate can be attached to the top surface of a circular jig made of ceramics by using heat-curable polymer, such as heat wax.

At this time, the substrate and the ceramics jig attached together must have a flatness of 1 to 3 μm or less for the purpose of uniform polishing. The attached substrate can be polished by a lapping machine and chemical mechanical polishing (CMP) machine and a cleaning process can be performed on the attached substrate, thus completing the periodic polarization domain inversion substrate.

Figure 4A:
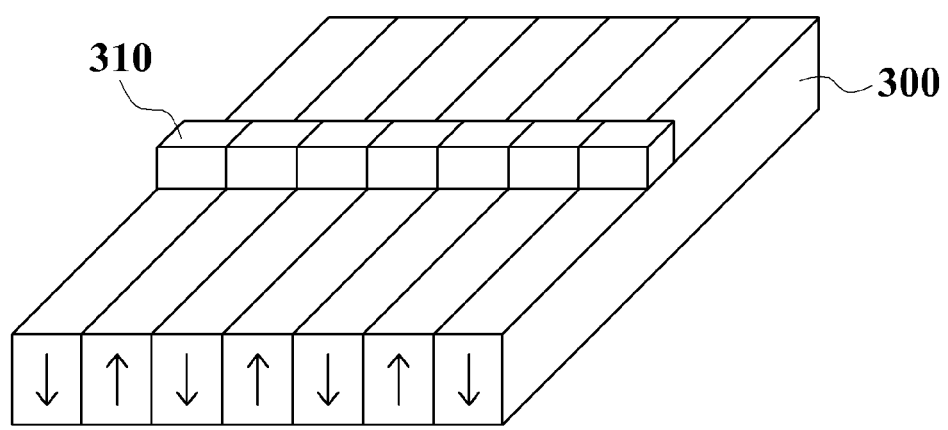
FIGS. 4a to 4d show processes of joining a substrate and a dummy substrate in which waveguides are formed according to the present invention.

In the case of the Z-axis ferroelectric crystals, the periodic polarization domain inversion substrate according to the present invention is used, and an optical waveguide having a projection shape as shown in FIG. 4a is used as a device. Thus, a higher quality can be obtained and wider application can be found.

FIG. 4a is a three-dimensional view of a Z-axis substrate in which optical waveguides 310 are formed by dry etch by employing a ferroelectric substrate 300 on which polishing is performed according to the present invention.

In order to etch the ferroelectric substrate 300 in which periodic polarization inversion structures are formed, dry etch employing a mixed gas comprising fluorine as a principle element, hydrogen and an inert gas, or wet etch employing a HF solution is performed.

A material of masks necessary for the etching process can include Ni, Ti, Cr, a photosensitizer or the like. In the case of wet etch, the photosensitizer is used.

If the etch masks are formed on the periodic polarization ferroelectric substrate, the etching process is performed to a depth of about 3 to 15 μm. The etched ferroelectric material has a lateral angle of about 75° to 85°, resulting in the optical waveguide 310 of a trapezoid having a wide base and a narrow upper side (FIG. 4a).

Figure 4B:
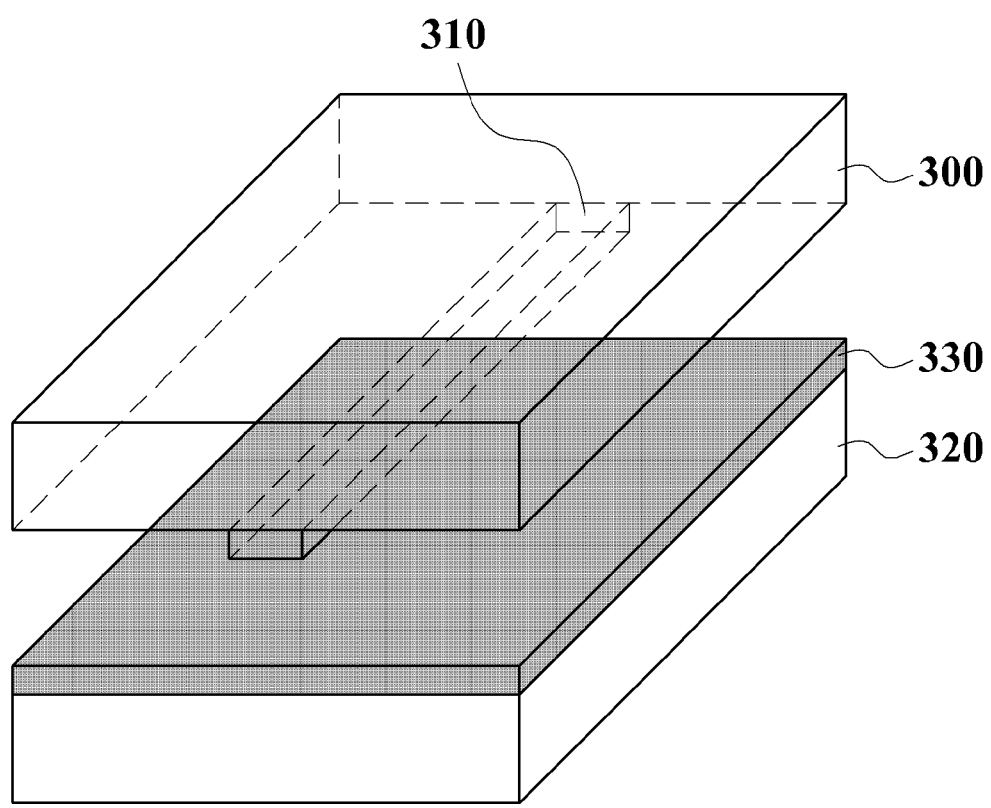

FIG. 4b shows a process of joining a dummy substrate 320 and the substrate 300 in which the optical waveguides 310 are formed.

The dummy substrate 320 can employ the same material as that of the ferroelectric substrate 300 or a glass-based substrate with a low refractive index. Curable polymer 330 such as curable epoxy or wax, which is cured by UV or thermal treatment, is coated on the dummy substrate 320 by spin coating, etc., or direct bonding (FIG. 4b).

After epoxy or wax, the curable polymer 330 is coated on the dummy substrate 320, the etched surface on the ferroelectric substrate 300 is joined to the dummy substrate 320, and the joining surface of the two substrates is cured by UV or heat. In case where direct joining is performed, the substrates are adhered together and experience thermal treatment in order to increase coherence.

At this time, a distance between the two substrates has to be equal, and defects such as alien substance or openings between the substrates have to be removed in advance.

Figure 4C:
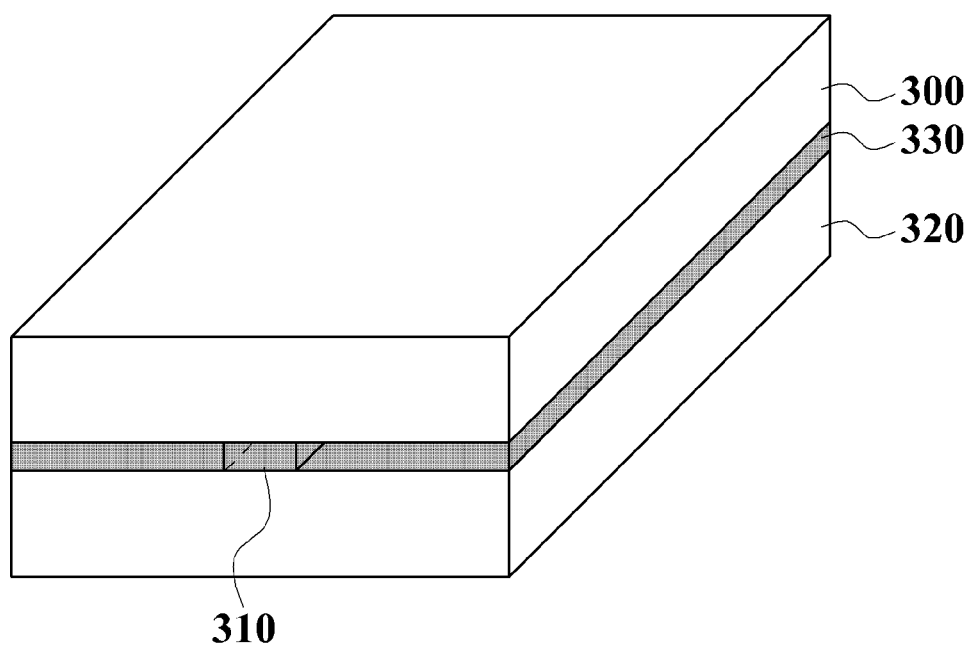

FIG. 4c is a three-dimensional view of the dummy substrate 320 and the substrate 300 in which the optical waveguides 310 are formed after joining. Epoxy or wax is cured by UV irradiation or thermal treatment. Thus, the dummy substrate 320 and the substrate 300 in which the optical waveguides 310 are formed are joined by the curable polymer 330, or intermediate media do not exit between the substrates by direct joining. The dummy substrate 320 is attached to the joined substrate 300 by utilizing a support (not shown) employing ceramics.

At this time, the support (not shown) attached to the dummy substrate 320 must have the degree of flatness of less than 1 μm in order to uniformly polish the ferroelectric substrate 300. The ferroelectric substrate 300 is polished up to the waveguide 310 by a lapping machine (not shown) and a chemical mechanical polishing machine (not shown) (FIG. 4c).

Figure 4D:
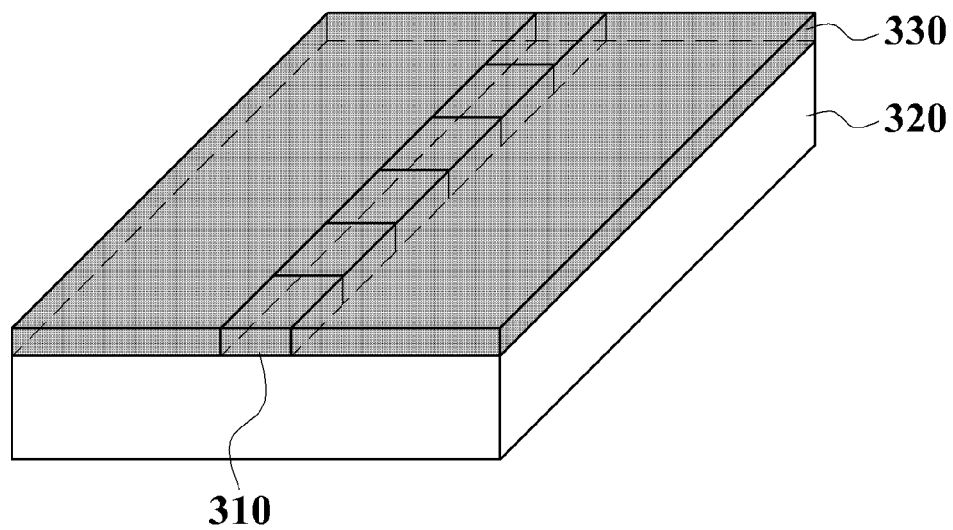

FIG. 4d is a three-dimensional view of the quasi-phase matched optical waveguide 310 that is completed according to the process of the present invention. If the polishing process is completed, the ferroelectric optical waveguide 310 having a reverse trapezium sectional shape remains on the dummy substrate 320. A post process such as a dry or wet etching process is then performed on the substrate prepared thus, so that the ferroelectric optical waveguide is formed on the dummy substrate 320 (FIG. 4d).

Therefore, if a periodically inverted domain fabrication method through surface etching of a ferroelectric substrate, such as $LiNbO_3$, $LiTaO_3$, $Mg:LiNbO_3$ or $Zn:LiNbO_3$, is performed according to the present invention, it is applicable to develop devices utilizable for display, optical communication, optical MEMS, and MEMS application devices and to fabricate devices with more improved functions than the existing ones.

The method of fabricating a periodic polarization-inverted waveguide for quasi-phase matching according to the present invention is advantageous in that it can be applied to various fields employing a ferroelectric substrate, such as $LiNbO_3$, $LiTaO_3$, $Mg:LiNbO_3$ or $Zn:LiNbO_3$.

Further, the method of fabricating a quasi-phase-matched waveguide according to the present invention can prevent problems that can occur in the conventional fabrication method, and is therefore advantageous in that it can obtain more accurate and uniform periodic domain inversion devices with a high quality and can fabricate devices that are cheaper and have a better performance.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method of fabricating a quasi-phase-matched waveguide, comprising the steps of:
    forming a metal etch mask on a ferroelectric single crystal substrate;
    etching the substrate by using the etch mask;
    removing the etch mask;
    forming conductive layers on the etched substrate;
    forming polarization regions by applying an electric field to the conductive layers; and
    flattening the substrate after removing the conductive layers.

2. A method of fabricating a quasi-phase-matched waveguide, comprising the steps of:
    forming a metal etch mask on a ferroelectric single crystal substrate;
    etching the substrate by using the etch mask;
    removing the etch mask;
    forming photoresist patterns on the etched substrate;
    coating a conductive solution on regions other than regions where the patterns are formed;
    forming polarization regions by applying an electric field to the conductive solution; and
    flattening the substrate after removing the conductive solution.

3. The method as claimed in claim 1 or 2, after the substrate is flattened, further comprising the steps of:
    forming a waveguide by etching the substrate;
    joining a dummy substrate to the waveguide; and
    removing regions other than the etched regions.

4. The method as claimed in claim 1 or 2, wherein in the step of etching the substrate, an etched depth ranges from 1 to 10 μm.

5. The method as claimed in claim 1 or 2, wherein the etch mask comprises any one of nickel, titanium, chrome and a photosensitizer.

6. The method as claimed in claim 3, wherein the ferroelectric single crystal substrate comprises at least one of $LiNbO_3$, $LiTaO_3$, $Mg:LiNbO_3$ and $Zn:LiNbO_3$.

7. The method as claimed in claim 3, wherein the step of joining the waveguide and the dummy substrate is performed by using ultraviolet-curable or heat-curable polymer material.

8. The method as claimed in claim 3, wherein in the step of forming the waveguide by etching the substrate, an etched depth ranges from 3 to 15 μm.

9. The method as claimed in claim 7, wherein the polymer material comprises epoxy or wax.

10. The method as claimed in claim 7, wherein the dummy substrate has the same material as that of the ferroelectric single crystal substrate.

11. The method as claimed in claim 7, wherein the dummy substrate has a material having a refractive index lower than that of the ferroelectric single crystal substrate.

12. The method as claimed in claim 11, wherein the dummy substrate comprises a glass-based material.

* * * * *